United States Patent
Tone et al.

(10) Patent No.: US 6,306,961 B1
(45) Date of Patent: Oct. 23, 2001

(54) THERMOPLASTIC RESIN COMPOSITION HAVING IMPACT RESISTANCE

(75) Inventors: Hiroshi Tone; Koji Yui, both of Kobe; Ikuhiro Mishima, Kakogawa; Kazuhito Wada, Akashi; Akira Takaki, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/425,724

(22) Filed: Oct. 22, 1999

Related U.S. Application Data

(63) Continuation-in-part of application No. PCT/JP98/01815, filed on Apr. 21, 1998, and a continuation-in-part of application No. PCT/JP98/03100, filed on Jul. 10, 1998.

(30) Foreign Application Priority Data

Apr. 24, 1997 (JP) .................................................. 9-107782

(51) Int. Cl.$^7$ ..................................................... C28L 51/04
(52) U.S. Cl. ................................. 525/63; 525/70; 525/86; 525/316; 525/317; 525/326.5; 524/504
(58) Field of Search ................................. 525/63, 86, 70, 525/316, 326.5, 317; 524/504

(56) References Cited

U.S. PATENT DOCUMENTS 4,206,290  6/1980  Yusa et al. .

5,959,033 * 9/1999 Demirors et al. ...................... 525/86

FOREIGN PATENT DOCUMENTS

| | | |
|---|---|---|
| 0 739 942 A1 | 10/1996 | (EP) . |
| 1105482 | 3/1968 | (GB) . |
| 2 29 1883 | 2/1996 | (GB) . |
| 6-2127336 | 9/1987 | (JP) . |
| 2-251553 | 10/1990 | (JP) . |
| 4-126771 | 4/1992 | (JP) . |
| 4-275354 | 9/1992 | (JP) . |
| 5-70508 | 3/1993 | (JP) . |
| 7-102024 | 4/1995 | (JP) . |
| 8-500621 | 1/1996 | (JP) . |
| 8-311292 | 11/1996 | (JP) . |
| 10-110018 | 4/1998 | (JP) . |

* cited by examiner

*Primary Examiner*—James J. Seidleck
*Assistant Examiner*—Olga Asinovsky
(74) *Attorney, Agent, or Firm*—Armstrong, Westerman, Hattori, McLeland & Naughton, LLP

(57) ABSTRACT

A thermoplastic resin composition comprises a thermoplastic resin (A) and graft copolymer particles (B) having a hollow rubber portion and graft chain, in which a volumetric proportion of hollow part in the hollow rubber portion of the graft copolymer particles is 1 to 70% by volume. The thermoplastic resin composition contains the thermoplastic resin and the graft copolymer particles in a weight ratio (A)/(B) of 2/98 to 100/1. The hollow part in the graft copolymer particle functions to further improve impact resistance.

16 Claims, No Drawings

THERMOPLASTIC RESIN COMPOSITION HAVING IMPACT RESISTANCE

CROSS-REFERENCE TO RELATED APPLICATION

This is a continuation-in-part of PCT international Application No. PCT/JP98/01815 filed on Apr. 21, 1998, pending, and also a continuation-in-part of international application PCT/JP98/03100 filed on Jul. 10, 1998, pending.

TECHNICAL FIELD OF THE INVENTION

The present invention relates to a thermoplastic resin composition having impact resistance, particularly to a thermoplastic resin composition having impact resistance and comprising a thermoplastic resin and graft copolymer particles having a hollow rubber portion.

BACKGROUND ART

Conventional thermoplastic resins, for example, vinyl chloride resins such as polyvinyl chloride; acrylic resins such as polymethyl methacrylate; aromatic vinyl resins such as polystyrene and styrene-acrylonitrile copolymer; carbonate resins such as polycarbonate; amide resins such as Nylon 6; polyester resins such as polyethylene terephthalate; olefin resins such as polypropylene; and polymer alloys of those resins, for example, alloy of styrene-acrylonitrile copolymer and polycarbonate, alloy of α-methylstyrene-acrylonitrile copolymer and polyvinyl chloride and alloy of polystyrene and polyphenylene oxide are inherently low in impact resistance. In order to improve impact resistance of those resins and alloys thereof, generally there have been widely employed methods for adding, to rubber particles, graft copolymer particles obtained by graft-copolymerizing various monomers. Though the degree of improvement of impact resistance by the addition of the graft copolymer particles is remarkable, for further improving the impact resistance efficiently, there have been made many proposals of improving graft copolymer particles. The methods disclosed in those proposals are a method of lowering Tg of rubber particles (JP-A-2-1763, JP-A-8-100095), a method of regulating gel content of rubber particles, a method of matching particle size and particle size distribution of rubber particles in graft copolymer particles to those of thermoplastic matrix resin (S. Wu, Polymer Engineering and Science, 30,753 (1990)), a method of adjusting compatibility of graft copolymer particles with thermoplastic matrix resin (JP-A-2-251553), etc.

However improvement by those methods have reached their limits, and it is difficult to improve impact resistance more significantly. Also when an adding amount of graft copolymer particles is increased, there is a problem that other characteristics, for example, processability, weather resistance and economic efficiency are lowered.

Meanwhile crazing and shearing yield are an important factor on improvement of impact resistance of a thermoplastic resin. In order to cause such phenomena, stress concentration in a molded article is inevitable. For that purpose, rubber particles are added. Optimizing a size, shape and softness (Tg and degree of crosslinking of rubber) of rubber particles also has a great effect on the stress concentration, and it is anticipated that making a large cavity in the rubber particle previously has greater influence on the stress concentration ("Impact Resistance of Plastics" by Ikuo Narisawa, pp. 131, 155, published by Siguma Shuppan (1994)). However this proposal is hypothetical, and how it is realized is not disclosed.

In order to realize production of hollow graft copolymer particles, the present inventors have made various studies even with respect to different techniques which are not usually studied, and have found that when a technique for hollowing of particles which is known in the field of paints is applied, hollow graft copolymer particles can be prepared and that when such hollow graft copolymer particles are added to a thermoplastic resin, impact resistance can be further improved. Thus the present invention was completed.

SUMMARY OF THE INVENTION

Namely the present invention relates to the thermoplastic resin composition which has improved impact resistance, comprises a thermoplastic resin (A) and graft copolymer particles (B) having a hollow rubber portion and graft chain and contains the thermoplastic resin (A) and the graft copolymer particles (B) in a weight ratio (A) (B) of 2/98 to 100/1.

It is preferable that the graft copolymer particles comprise a particle composed of 10 to 95% (% by weight, hereinafter the same) of the hollow rubber portion and 5 to 90% of the graft chain obtained by polymerizing a vinyl monomer graft-copolymerizable with the rubber portion.

It is preferable that a volumetric proportion of hollow part in the hollow rubber portion of the graft copolymer particles is 1 to 70% by volume on the basis of the hollow rubber portion and further that the hollow rubber portions comprise hollow rubber particles having an average particle size of 50 to 2,000 nm.

It is preferable that the rubber of the hollow rubber portion constituting the graft copolymer particle is a rubber polymer of a diene rubber, acrylic rubber, silicone rubber or olefin rubber, or a rubber composition comprising 100 parts (part by weight, hereinafter the same) of a crosslinked copolymer obtained by polymerization of 0.05 to 40% of a crosslinkable monomer, 99.95 to 60% of a monomer copolymerizable with the crosslinkable monomer and 0 to 0.5% of a hydrophilic monomer and 0.05 to 50 parts of a polymer being different from the crosslinked copolymer.

Examples of the preferable starting vinyl monomer for the graft chains constituting the graft copolymer particles are a vinyl monomer comprising 60 to 100% of at least one vinyl monomer selected from the group consisting of an aromatic vinyl compound, vinyl cyanide compound, vinyl chloride and (meth)acrylate compound and 0 to 40% of other monomer copolymerizable with said monomer; or a mixture of the vinyl monomers.

The preferable thermoplastic resin which is another component of the present invention is at least one selected from the group consisting of vinyl chloride resin, aromatic vinyl resin, acrylic resin, carbonate resin, polyester resin, amide resin and olefin resin. It is preferable that the vinyl chloride resin contains vinyl chloride unit in an amount of not less than 50% and that the aromatic vinyl resin contains an aromatic vinyl unit in an amount of not less than 50%.

As the thermoplastic resin, there is also used preferably a polymer alloy containing at least one of vinyl chloride resin, aromatic vinyl resin, acrylic resin, carbonate resin, polyester resin, amide resin and olefin resin, particularly a polymer alloy of the aromatic vinyl resin and vinyl chloride resin.

DETAILED DESCRIPTION OF THE INVENTION

The thermoplastic resin composition of the present invention which has improved impact resistance basically comprises a thermoplastic resin and graft copolymer particles.

The graft copolymer particle is composed of a hollow rubber portion and graft chain grafting on the hollow rubber portion.

The hollow rubber portion is composed of hollow rubber particle. The hollow rubber particle can be prepared by applying technique used in the field of paints. For example, there are (a) a method of preparing a W/O/W emulsion and polymerizing a monomer of the O layer (O: hydrophobic, W: hydrophilic); (b) a method of hollowing by swelling core-shell particles having a swellable core at a temperature of not less than Tg of the shell layer; (c) a method of two stage polymerization of polymers having different solubility parameters; (d) a method of finely dispersing a polymerizable monomer mixture containing a crosslinkable monomer and hydrophilic monomer and an oily substance in water to give a O/W emulsion and then polymerizing for crosslinking and removing the oily substance after the crosslinking; and (e) a method of using a phenomenon, in which a carboxylic acid unit copolymerized in the particle moves in the particle under acidic or alkaline conditions ("Application of Synthetic Latex" by Takaaki Sugimura, et al, pp. 285, published by Kobunshi Kankokai (1993)).

In the present invention, the hollow rubber particles can be prepared by any of the methods (a) to (e). From the viewpoint of not making the rubber of the hollow rubber portion hard, the methods (b) and (e) are used preferably.

According to the method (d), there is no problem in that complete hollow rubber portion is synthesized. However, when a crosslinking agent is used in much amount, there is a case of causing a problem that the rubber becomes hard and impact strength is lowered.

The example of the method (b) is as mentioned below. First rubber polymer particles or hard polymer particles are used as a core. To an aqueous dispersion or latex of these polymer particles are added a monomer mixture for a rubber polymer forming a shell and an oily substance for swelling the polymer particles of the core. Thus the polymer particles of the core are swelled by the oily substance. At the time when the polymer particles are swelled enough, the monomer mixture is polymerized to form the shell comprising the rubber polymer. Then by removing the oily substance swelling the core, the core is shrunk and a cavity arises between the shell of rubber polymer and the polymer particle of the core. Thus the hollow rubber particles can be obtained.

As mentioned above, hollow rubber particles can be prepared by various methods. The hollow rubber particles of the present invention may be prepared by any of the methods.

In the present invention, the "hollow rubber particle" which constitutes the hollow rubber portion of the graft copolymer particle may have cavity (hollow part) within the hollow rubber particle.

The shape of the hollow part (cavity) is not limited, and the cavity may be in the form of sphere, flat sphere, pore or honeycomb. Also on the inner surface of the hollow part, there may exist concave or convex or protrusion. The number of the cavities is not limited to one, and many cavities may exist. The cavity may be in the form of honeycomb or salami.

In the present invention, even if the hollow rubber particle is in any form, a volumetric proportion (cavity ratio) of the hollow part, in which a remarkable effect of impact resistance can be exhibited, is from 1 to 70% by volume, preferably 3 to 60% by volume, particularly 5 to 50% by volume based on the total volume of the hollow rubber portion.

An average particle size of the hollow rubber particles is preferably from 50 to 2,000 nm, more preferably from 60 to 1,700 nm, particularly preferably from 70 to 1,500 nm from the viewpoint of excellent impact resistance. The particle size distribution is not limited particularly. Particles having smaller particle size may be increased, and vice versa, or remarkably narrow particle size distribution may be employed.

With respect to the rubber polymer of the hollow rubber particles, a glass transition temperature (Tg) thereof is preferably not more than 0° C., more preferably not more than −20° C., particularly preferably not more than −30° C. from the viewpoint of excellent impact resistance. Also preferable are a diene rubber, acrylic rubber, silicone rubber and olefin rubber from the points of making it possible to easily form the hollow parts, regulate a cavity ratio and exhibit impact resistance stably.

Examples of the diene rubber are, for instance, a butadiene rubber, styrene-butadiene rubber, acrylonitrile-butadiene rubber, and the like. Examples of the acrylic rubber are, for instance, a butyl acrylate rubber, butadiene-butyl acrylate rubber, 2-ethylhexyl acrylate-butyl acrylate rubber, 2-ethylhexyl methacrylate-butyl acrylate rubber, stearyl acrylate-butyl acrylate rubber, dimethylsiloxane-butyl acrylate rubber, a composite rubber of a silicone rubber and butyl acrylate rubber, and the like. Examples of the silicone rubber are, for instance, a polydimethylsiloxane rubber, and the like. Examples of the olefin rubber are, for instance, an ethylene-propylene rubber, ethylene-propylene-diene rubber and the like. Among them, the diene rubber and acrylic rubber are preferable from the viewpoint of easy control of the cavity ratio and increased improvement of impact resistance and from the points that the rubbers can be formed into a latex and preparation is easy. Unrestricted examples of more preferable rubber are a styrene-butadiene rubber, butyl acrylate rubber, and the like.

Further in the present invention, it is preferable that the hollow rubber particles prepared by the method (b) are used as a material for the graft copolymer particles. The technique for the preparation is explained below.

First the polymer particles to be used as a core are prepared. Those polymer particles for the core may be those which are swelled by an oily substance, and play an important role in forming the hollow parts.

Examples of the material for the core polymer particles are a rubber polymer, for instance, a diene rubber such as a butadiene rubber, styrene-butadiene rubber or acrylonitrile-butadiene rubber, an acrylic rubber such as a butyl acrylate rubber, butadiene-butyl acrylate rubber, 2-ethylhexyl acrylate-butyl acrylate rubber, 2-ethylhexyl methacrylate-butyl acrylate rubber, stearyl acrylate-butyl acrylate rubber, dimethylsiloxane-butyl acrylate rubber, a composite rubber of a silicone rubber and butyl acrylate rubber or butyl methacrylate rubber, a silicone rubber such as a polydimethylsiloxane rubber, an olefin rubber such as an ethylene-propylene rubber or ethylene-propylene-diene rubber; and a hard polymer such as polystyrene, styrene-acrylonitrile copolymer, styrene-methyl methacrylate copolymer; and the like. From the viewpoint of improving impact resistance, the rubber polymers are more preferable. It is preferable that these polymer particles are prepared by emulsion polymerization. The emulsion polymerization can be carried out through usual method.

Subsequently the polymer particle for the core is used as a core, and a crosslinked copolymer which becomes a shell and is different from the polymer for the core in physical properties of a rubber is formed around the polymer particle. Before forming the shell of the rubber polymer, the polymer particles as the core are swelled with an oily substance to increase the volume of the particles. The oily substance may be selected properly depending on the polymer used for the core and the monomer used for forming the shell. For example, toluene, benzene or the like is used when the core is a diene rubber. Also, particularly even when the oily substance is not added, depending on the monomer used for the polymerization of the shell, the polymer particles for the core is swelled by the monomer and then the hollow particles are formed through volumetric shrinkage during the polymerization. It is preferable, from the polymerizing operations of the shell, that the oily substance is added after mixed with monomers for forming the shell which are explained hereinafter.

The monomers for forming the shell are the monomers being capable of forming the rubber polymer for the above-mentioned hollow rubber particles by polymerizing. The monomers comprise preferably 0.05 to 40% of a crosslinkable monomer (1), 99.95 to 60% of a monomer (2) copolymerizable with the crosslinkable monomer (1) and 0 to 0.5% of a hydrophilic monomer (3), more preferably 0.1 to 35% of the crosslinkable monomer (1) and 99.9 to 65% of the monomer (2), particularly preferably 0.3 to 30% of the crosslinkable monomer (1) and 99.7 to 70% of the monomer (2).

The monomer (2) mainly gives physical properties of the rubber. The crosslinkable monomer (1) functions to maintain a shape of the hollow rubber particles. A known crosslinking agent having two or more polymerizable functional groups in its molecule is used as the crosslinkable monomer (1). Examples thereof are, for instance, one or more of allyl methacrylate, divinylbenzene, diallyl phthalate, polyethylene glycol dimethacrylate, triallyl cyanurate, triallyl isocyanurate, triallyl trimellitate, 1,3-butylene glycol dimethacrylate, ethylene glycol dimethacrylate, trimethylolpropane trimethacrylate, and the like.

The monomer (2) copolymerizable with the crosslinkable monomer (1) constitutes an essential portion of the rubber polymer for the above-mentioned hollow rubber particles. Examples of the monomer (2) giving a diene rubber are, for instance, a conjugate diene monomer such as butadiene or isoprene or a monomer mixture of butadiene, styrene and acrylonitrile; and examples of the monomer (2) giving an acrylic rubber are, for instance, butyl acrylate alone or a monomer mixture of butyl acrylate with an alkyl (meth) acrylate having an alkyl group of C2 to C18 such as ethyl acrylate, ethyl methacrylate, 2-ethylhexyl acrylate, 2-ethylhexyl methacrylate, butyl methacrylate, lauryl acrylate or lauryl methacrylate or with butadiene or dimethylsiloxane; and the like.

Preferable combinations of the polymer for the shell and the polymer for the core are, for example, a diene rubber as the polymer for the core and an acrylic rubber as the polymer for the shell, etc. More specifically there are a styrene-butadiene rubber as the polymer for the core and a butyl acrylate rubber as the polymer for the shell, etc.

The synthesis of the crosslinked copolymer may be carried out by any polymerization method. From the viewpoint of stable control of the particle size and enhancement of impact strength, emulsion polymerization is preferable. A polymerization initiator, chain transfer agent and emulsifying agent which are used for the polymerization are not particularly limited. As the polymerization initiator, known initiators, for example, a thermal cracking initiator such as potassium persufate, a rhedox initiator such as Fe-reducing agent-organic peroxide, and the like can be used. As the chain transfer agent, known chain transfer agents, for example, t-dodecylmercaptan, n-dodecylmercaptan, α-methylstyrene dimer, terpinolene and the like can be used. As the emulsifying agent, known emulsifying agents, for example, a fatty acid metal salt emulsifying agent such as sodium oleate, sodium palmitate or sodium rhodinate, a sulfonic acid metal salt emulsifying agent such as sodium dodecylbenzenesulfonate, sodium alkylsulfonate having 12 to 20 carbon atoms or sodium dioctylsulfosuccinate, and the like can be used. Polymerization temperature and time may be selected optionally depending on monomers and initiators. From the viewpoint of economic efficiency and polymerization stability, the polymerization is carried out preferably at 30° to 120° C. for 2 to 50 hours.

At the time of the polymerization, there also occurs crosslinking. A gel fraction of the crosslinked polymer is preferably from 5 to 100%, more preferably from 10 to 100%, particularly preferably from 20 to 100%, from the viewpoint of impact resistance. A rubber polymer having a low gel fraction or one having a high gel fraction may be mixed depending on the matrix resin and the required characteristics.

After the polymerization, by removing the oily substance swelling the polymer particles of the core by evaporation, etc., the polymer particles shrink, thus causing a cavity between the core and the shell to give hollow rubber particles. According to this method, the volumetric proportion (cavity ratio) of the hollow part in the hollow rubber particle becomes 1 to 70% by volume.

Mentioned above is the method for preparing the hollow rubber particles used in the present invention, which is explained according to the method (b). The hollow rubber particles usable in the present invention can be also prepared by other methods (a) to (e).

On the so-prepared hollow rubber particles are provided graft chains by graft-copolymerizing a vinyl monomer. Those graft chains function to disperse the rubber particles uniformly in the thermoplastic resin. The proportion of the hollow rubber particle to the graft chain is preferably 10/90 to 95/5, more preferably 15/85 to 92/8, particularly preferably 20/80 to 92/8. By employing the proportion in the abovementioned range, an excellent effect of improving impact resistance can be obtained.

Examples of the vinyl monomer constituting the graft chains are an aromatic vinyl compound, vinyl cyanide compound, (meth)acrylate compound, vinyl chloride and the like. Further a monomer copolymerizable therewith may occupy, as an optional component, at most 40% in the graft chains.

Example of the aromatic vinyl compound is at least one of styrene, α-methylstyrene, p-methylstyrene, p-isopropylstyrene, chlorostyrene, bromostyrene and the like. Example of the vinyl cyanide compound is at least one of acrylonitrile, methacrylonitrile and the like. Examples of the (meth)acrylate compound are at least one of methacrylates having an alkyl group of C1 to C18 such as methyl methacrylate, ethyl methacrylate, butyl methacrylate, 2-ethylhexyl methacrylate and stearyl methacrylate or at least one of acrylates having an alkyl group of C1 to C18 such as methyl acrylate, ethyl acrylate, butyl acrylate, 2-ethylhexyl acrylate and stearyl acrylate.

Examples of the other copolymerizable monomer are (meth)acrylic acid, derivatives of (meth)acrylic acid other than the above-mentioned (meth)acrylate compound, such as glycidyl (meth)acrylate; maleimide compounds such as maleimide and N-phenylmaleimide; and the like. Those monomers may be used solely or in a mixture of two or more.

The graft chains can be synthesized by any graft-copolymerization methods. From the viewpoint of stability in control of a graft ratio and impact resistance, emulsion polymerization is used for the synthesis.

A polymerization initiator, chain transfer agent and emulsifying agent which are used for the graft coolymerization are not particularly limited. As the polymerization initiator, known initiators, for example, a thermal cracking initiator such as potassium persufate, a rhedox initiator such as Fe-reducing agent-organic peroxide, and the like can be used. As the chain transfer agent, known chain transfer agent, for example, t-dodecylmercaptan, n-dodecylmercaptan, α-methylstyrene dimer, terpinolene and the like can be used. As the emulsifying agent, known emulsifying agents, for example, a fatty acid metal salt emulsifying agent such as sodium oleate, sodium palmitate or sodium rhodinate, a sulfonic acid metal salt emulsifying agent such as sodium dodecylbenzenesulfonate, sodium alkylsulfonate having 12 to 20 carbon atoms or sodium dioctylsulfosuccinate, and the like can be used. Polymerization temperature and time may be selected optionally depending on monomers and initiators. From the viewpoint of economic efficiency and polymerization stability, the polymerization is carried out preferably at 30° to 120° C. for 2 to 30 hours.

The emulsion graft copolymerization can be carried out by adding a vinyl monomer, initiator, etc. to an emulsified dispersion of the above-mentioned hollow rubber particles. The method for adding the vinyl monomer is not particularly limited. The vinyl monomer may be added at one time or may be added batchwise or continuously. When an amount of the vinyl monomer is lower in comparison with the amount of the hollow rubber particles, from the viewpoint of enhancing a graft efficiency and impact resistance, it is preferable that not less than 60% of the total amount of the vinyl monomers used is added continuously.

From the viewpoint of enhancing impact resistance, the graft ratio is preferably from 5 to 100%, more preferably from 8 to 80%, particularly preferably from 10 to 70%.

From the viewpoint of exhibiting impact strength, the average particle size of the graft copolymer particles is preferably from 50 to 2,000 nm.

By the method mentioned above, graft copolymer particles (B) having hollow rubber portions and graft chains can be obtained. The graft copolymer particles (B), when added to the thermoplastic resin (A), give excellent impact resistance to the resin composition. An adding amount of the graft copolymer particles varies depending on kind and cavity ratio thereof, kind of the thermoplastic resin, etc. It is preferable, from the viewpoint of cost and enhancement of impact resistance, that the thermoplastic resin (A) and the graft copolymer particles (B) are added in a weight ratio (A)/(B) of 2/98 to 100/1, more preferably 3/97 to 99 1, particularly 4/96 to 98/2.

Example of the thermoplastic resin used in the present invention is one or more of a vinyl chloride resin, aromatic vinyl resin, acrylic resin, carbonate resin, polyester resin, amide resin and olefin resin. The impact resistance of those resins is required to be improved particularly.

Examples of the vinyl chloride resin are a polyvinyl chloride, chlorinated vinyl chloride, vinyl chloride copolymer containing not less than 50% of vinyl chloride unit (copolymerizable components are vinyl acetate, ethylene, etc.), and the like. From the viewpoint of enhancement of impact resistance and processability, a weight average molecular weight thereof is preferably from 20,000 to 100,000.

Examples of the acrylic resin are polymethyl methacrylate, methyl methacrylate copolymer containing not less than 50% of methyl methacrylate unit (copolymerizable components are methyl acrylate, butyl acrylate, styrene, etc.), and the like. From the viewpoint of enhancement of impact resistance and processability, a weight average molecular weight thereof is preferably from 20,000 to 200,000.

Examples of the aromatic vinyl resin are polystyrene, styrene-acrylonitrile copolymer, α-methylstyrene-acrylonitrile copolymer, styrene-α-methylstyrene-acrylonitrile copolymer, styrene-maleimide copolymer, styrene-maleimide-acrylonitrile copolymer, styrene-α-methylstyrene-maleimide-acrylonitrile copolymer, styrene-maleic anhydride copolymer, and the like. From the viewpoint of enhancement of impact resistance and processability, a weight average molecular weight thereof is preferably from 10,000 to 500,000, more preferably from 20,000 to 400,000, particularly preferably from 30,000 to 300,000.

Examples of the carbonate resin are bisphenol polycarbonate, aliphatic polycarbonate, and the like. From the viewpoint of impact resistance and processability, a number average molecular weight thereof is preferably from 1,000 to 100,000, more preferably from 5,000 to 80,000, particularly preferably from 10,000 to 60,000.

Examples of the polyester resin are polyethylene terephthalate, polybutylene terephthalate, and the like. From the viewpoint of impact resistance and processability, a number average molecular weight thereof is preferably from 1,000 to 100,000, more preferably from 5,000 to 80,000, particularly preferably from 10,000 to 60,000.

Examples of the amide resin are Nylon 6, Nylon 6,6, Nylon 12, and the like. From the viewpoint of impact resistance and processability, a number average molecular weight thereof is preferably from 1,000 to 100,000, more preferably from 5,000 to 80,000, particularly preferably from 10,000 to 60,000.

Examples of the olefin resin are polypropylene, polyethylene, cyclic polyolefin, and the like.

Further a polymer alloy comprising one or more of those vinyl chloride resin, acrylic resin, aromatic vinyl resin, carbonate resin, polyester resin, amide resin and olefin resin can be used as the thermoplastic resin. Examples thereof are, for instance, alloy of vinyl chloride resin-aromatic vinyl resin and in addition, alloy of styrene-acrylonitrile copolymer and polycarbonate, alloy of styrene-acrylonitrile copolymer and Nylon 6, alloy of polyethylene terephthalate and polycarbonate, alloy of polystyrene and polyphenylene oxide, and the like.

Particularly an alloy of vinyl chloride resin-aromatic vinyl resin is preferable from the viewpoint of flowability. Examples of the aromatic vinyl resin used on such an alloy are polystyrene, styrene-acrylonitrile copolymer, α-methylstyrene-acrylonitrile copolymer, styrene-α-methylstyrene-acrylonitrile copolymer, styrene-maleimide copolymer, styrene-maleimide-acrylonitrile copolymer, styrene-α-methylstyrene-maleimide-acrylonitrile copolymer, styrene-maleic anhydride copolymer, and the like. From the viewpoint of enhancement of impact resistance and processability, a weight average molecular weight thereof is preferably from 10,000 to 300,000, more preferably from 15,000 to 200,000, particularly preferably from 20,000 to 150,000. Examples of the vinyl chloride resin are polyvinyl chloride, a copolymer containing not less than 80% of a vinyl chloride unit (copolymerizable components are ethylene, etc.), chlorinated polyvinyl chloride, and the like. From the viewpoint of enhancement of impact resistance and processability, the polymerization degree of the vinyl chloride resin is preferably from 300 to 2,000, more preferably from 400 to 1,500, particularly preferably from 450 to 1,300. With respect to the proportion (weight ratio) of the aromatic vinyl resin and vinyl chloride resin, from the viewpoint of enhancement of impact resistance and processability, the aromatic vinyl resin/vinyl chloride resin ratio is preferably from 5/95 to 90/10, more preferably from 10/90 to 80/20, particularly preferably from 15/85 to 75/25.

For the resin composition of the present invention, well-known antioxidant, heat stabilizer, ultraviolet ray absorbent, pigment, antistatic agent, lubricant or the like can be used optionally as case demands. Particularly phenolic, sulfuric, phosphoric and hindered amine stabilizers which are used for the aromatic vinyl resin and vinyl chloride resin; stabilizers such as Sn, Pb and Ca stabilizers; ultraviolet ray absorbents such as benzophenone and benzotriazole ultraviolet ray absorbents; and internal or external lubricants such as organopolysiloxane, aliphatic hydrocarbon, ester of higher fatty acid or higher alcohol, amide or bisamide of higher fatty acid or its modified product, oligoamide and metal salt of higher fatty acid; and the like can be used for giving the composition of the present invention having higher performance as the resin for molding. Also a known flame retardant, reinforcement, filler and the like can be added. Examples of the flame retardant are a bromic organic compound such as tetrabromobisphenol A; phosphoric organic compound such as triphenyl phosphite; inorganic metal compounds of $Mg(OH)_2$, $Al(OH)_3$, $Sb_2O_3$ and ZnO. Examples of the reinforcement and filler are a glass fiber, carbon fiber, stainless steel fiber, aluminum flake, talc, mica, calcium carbonate, whisker and the like.

Those stabilizers, lubricants, flame retardants, reinforcements and fillers can be used solely or in a mixture of two or more thereof.

A resin mixture of the graft copolymer particles (B) and thermoplastic resin (A) of the present invention can be prepared by mixing them in the form of a latex, slurry, solution, powder and pellets or in combination of these forms, depending on the method of preparation of (A) and (B). In case where the both of the graft copolymer particles and thermoplastic resin are in the form of a latex, a polymer powder may be obtained by a usual method, for example, by adding, to the latex, a salt of an alkaline earth metal such as calcium chloride, magnesium chloride or magnesium sulfate, a salt of an alkali metal such as sodium chloride or sodium sulfate, or an inorganic or organic acid such as hydrochloric acid, sulfuric acid, phosphoric acid or acetic acid to solidify the latex, and then dehydrating and drying the latex. Also a spray drying method can be used.

A part of the stabilizer and lubricant used can be added to the latex or slurry of the above-mentioned resin in the form of a dispersion.

The resin composition of the present invention can be prepared by kneading the graft copolymer particles and thermoplastic resin powder or pellets or a mixture thereof in the form of powder or pellets, and if necessary, adding a stabilizer, lubricant, flame retardant, reinforcement, pigment, etc., with a known melt-kneading machine such as Banbury mixer, roll mill, single screw extruder or double screw extruder.

The resin composition of the present invention can be molded by known molding method such as extrusion molding, injection molding or vacuum molding, and can provide a molded article having more excellent impact resistance.

The present invention is explained by means of Preparation Examples and Examples, but is not limited to them. "Part" indicates part by weight and "%" indicates % by weight unless otherwise noticed.

PREPARATION EXAMPLE

[1] Preparation of Latex of Polymer Particles (I) for Core (1) Preparation of Latex (I-1)

A pressure resistive polymerizer (100 liters) was charged with 200 parts of water, followed by deaeration and replacing with nitrogen gas. Then the polymerizer was charged with 3.5 parts of sodium oleate, 0.4 part of tripotassium phosphate, 0.2 part of sodium β-naphthalene sulfonate formaldehyde condensate, 0.005 part of ethylenediaminetetraacetic acid disodium salt, 0.002 part of ferrous sulfate ($7H_2O$), 10 parts of t-dodecylmercaptan, 25 parts of styrene (St) and 75 parts of butadiene (Bd). After heating up to 50° C., 0.1 part of paramenthane hydroperoxide and 0.1 part of sodium formaldehyde sulfoxylate were added and polymerization was carried out for 15 hours to give a polymer (styrene-butadiene rubber) latex (I-1) for the core having an average particle size of 60 nm.

(2) Preparation of Latex (I-2)

A pressure resistive polymerizer (100 liters) was charged with 200 parts of water, followed by deaeration and replacing with nitrogen gas. Then the polymerizer was charged with 100 parts of butadiene (Bd), 1 part of sodium oleate, 2 parts of sodium rhodinate, 0.05 part of sodium carbonate, 0.2 part of potassium persulfate and 0.2 part of t-dodecylmercaptan. After heating up to 60° C., polymerization was started and terminated in 12 hours to give a butadiene rubber latex (I-2) for the core. Percentage of the polymerization was 96%, and an average particle size of the latex was 85 nm.

(3) Preparation of Latex (I-3)

In a homogenizer, 200 parts of pure water, 1 part of sodium dodecylbenzene sulfonate, 100 parts of octamethylcyclotetrasiloxane (MeSi), 2 parts of tetraethoxysilane (EtSi) and 0.5 part of γ-methacryloyloxypropyldimethoxymethylsilane were emulsified and dispersed to give a latex of organosiloxane.

After deaeration and replacing with nitrogen gas, the polymerizer was charged with the above-mentioned latex of organosiloxane, heated up to 80° C. and charged with 0.2 part of dodecylbenzene sulfonate, followed by stirring for five hours. After allowed to stand at 23° C. for 24 hours, the mixture was neutralized with sodium hydroxide to terminate the polymerization. Percentage of the polymerization was 90%, and an average particle size of a silicone rubber latex (I-3) was 130 nm.

(4) Preparation of Latex (I-4)

A polymerizer was charged with 200 parts of pure water, followed by deaeration and replacing with nitrogen gas. Then the polymerizer was charged with 0.15 part of sodium palmitate. After heating up to 45° C., 0.01 part of ethylenediaminetetraacetic acid disodium salt, 0.0025 part of ferrous sulfate (7H$_2$O) and 0.4 part of sodium formaldehyde sulfoxylate were added. Then a mixture of 100 parts of butyl acrylate (BA), 1.5 parts of triallyl cyanurate and 0.2 part of paramenthane hydroperoxide was added dropwise continuously for eight hours. One and a half hours and 3 hours after starting of the addition, 0.15 part of sodium palmitate was added, respectively. After completion of the addition, the polymerization was carried out at 45° C. for one hour with stirring. Percentage of the polymerization was 96%, and an average particle size of a butyl acrylate rubber latex (I-4) was 185 nm.

[2] Preparation of Hollow Rubber Particle (II)

(1) Preparation of Hollow Rubber Particle (II-1)

A polymerizer was charged with 10 parts of the rubber latex (I-1) (solid content) and 70 parts of water, followed by mixing. Thereto was added a mixture of 75 parts of butyl acrylate (BA), 7.5 parts of allyl methacrylate (ALMA), 19 parts of toluene, 0.75 part of a 5% aqueous solution of sodium lauryl sulfate (solid content) and 400 parts of water, which had been finely dispersed with a homogenizer, followed by stirring at room temperature for two hours. After replacing with nitrogen gas in the polymerizer, 0.005 part of ethylenediaminetetraacetic acid disodium salt, 0.002 part of ferrous sulfate (7H$_2$O), 1 part of paramenthane hydroperoxide and 0.2 part of sodium formaldehyde sulfoxylate were added, and the polymerization was carried out at 40° C. for two hours to give a latex of hollow rubber particles (II-1).

(2) Preparation of Hollow Rubber Particle (II-2)

A polymerizer was charged with 2 parts of the rubber latex (I-1) (solid content) and 250 parts of water, followed by mixing. Thereto was added a mixture of 100 parts of butyl acrylate (BA), 1.2 parts of allyl methacrylate (ALMA), 1 part of sodium dioctylsulfosuccinate (solid content) and 200 parts of water, which had been finely dispersed with a homogenizer, followed by stirring at room temperature for two hours. After replacing with nitrogen gas in the polymerizer, 0.005 part of ethylenediaminetetraacetic acid disodium salt, 0.002 part of ferrous sulfate (7H$_2$O), 0.8 part of paramenthane hydroperoxide and 0.2 part of sodium formaldehyde sulfoxylate were added, and the polymerization was carried out at 40° C. for two hours to give a latex of hollow rubber particles (II-2) having an average particle size of 190 nm. Percentage of the polymerization was 96%, and a cavity ratio was 26% by volume.

(3) Preparation of Hollow Rubber Particle (II-3)

A latex of hollow rubber particles (II-3) having an average particle size of 110 nm were prepared in the same manner as in (II-2) except that 4 parts of the latex (I-1) (solid content) and 0.8 part of allyl methacrylate (ALMA) were used. Percentage of the polymerization was 95%, and a cavity ratio was 22% by volume.

(4) Preparation of Hollow Rubber Particles (II-4) and (II-5)

Thirty parts of the latex of hollow rubber particles (II-2) (solid content) and 70 parts of the rubber latex (I-2) (solid content) were mixed, and the mixture was adjusted to a latex having a solid content of 31%. After adjusting pH of the latex to 11, 3.2 parts of an acid latex (S) (solid content) was added, and the polymerization was carried out for one hour for enlarging the particles with stirring, thereby giving a latex of enlarged hollow rubber particles (II-4). An average particle size of the particles was 410 nm, and a cavity ratio was 8% by volume.

A latex of enlarged hollow rubber particles (II-5) was prepared in the same manner as in (II-4) except that the rubber latex (I-3) was used instead of the rubber latex (I-2). An average particle size of the particles was. 430 nm, and a cavity ratio was 8% by volume.

The acid latex (S) was a latex of BMA/BA/MA (70/14/16) rubber copolymer which was prepared by the method disclosed in JP-A-8-134316.

(5) Preparation of Hollow Rubber Particles (II-6) to (II-7)

A hundred parts of the latex of hollow rubber particles (II-2) (solid content) was adjusted to a latex having a solid content of 31%. After adjusting pH of the latex to 11, 3.2 parts of an acid latex (S) (solid content) was added, and the polymerization was carried out for one hour for enlarging the particles with stirring, thereby giving a latex of enlarged hollow rubber particles (II-6). An average particle size of the particles was 380 nm, and a cavity ratio was 26% by volume.

A latex of enlarged hollow rubber particles (II-7) was prepared in the same manner as in (II-6) except that 2.2 parts of an acid latex (S) (solid content) was used. An average particle size of the particles was 590 nm, and a cavity ratio was 26% by volume.

(6) Preparation of Rubber Latexes (II-8) to (II-9) for Comparison

Seventy parts of the rubber latex (I-2) (solid content) and 30 parts of the latex (I-4) (solid content) were mixed, and the mixture was adjusted to a latex having a solid content of 31%. After adjusting pH of the latex to 11, 3.2 parts of an acid latex (S) (solid content) was added, and the polymerization was carried out for one hour for enlarging the particles with stirring, thereby giving an enlarged solid rubber latex (II-8) for comparing use. An average particle size of the particles was 420 nm, and a cavity ratio was 0% by volume.

An enlarged solid rubber latex (II-9) for comparison was prepared in the same manner as in (II-8) except that 70 parts of the rubber latex (I-3) (solid content) and 30 parts of (I-4) (solid content) were used. An average particle size of the particles was 400 nm, and a cavity ratio was 0% by volume.

Components and physical properties of the hollow rubber particles (II-4) to (II-7) and solid rubber particles (II-8) and (II-9) are shown in Table 1.

TABLE 1

|  | Hollow rubber particles (II) | | | | For comparison II-8 | For comparison II-9 |
| --- | --- | --- | --- | --- | --- | --- |
|  | II-4 | II-5 | II-6 | II-7 | | |
| Hollow rubber particles (II) | II-2 | II-2 | II-2 | II-2 | | |
| Solid content (part) | (30) | (30) | (100) | (100) | — | — |
| Rubber latex (I) | I-2 | I-3 | | | I-2 (70) | I-3 (70) |
| Solid content (part) | (70) | (70) | — | — | I-4 (30) | I-4 (30) |
| Acid latex (S) | | | | | | |
| Solid content (part) | 3.2 | 3.2 | 3.2 | 2.2 | 3.2 | 3.2 |
| Cavity ratio (% by volume) | 8 | 8 | 26 | 26 | 0 | 0 |
| Average particle size (nm) | 410 | 430 | 380 | 590 | 420 | 400 |

[3] Preparation of Hollow Graft Popolymer Particles (III)

(1) Preparation of Graft Copolymer Particles (III-1)

After heating 85 parts of the latex of hollow rubber particles (II-1) (solid content) up to 45° C., 0.15 part of a 5% aqueous solution of sodium lauryl sulfate (solid content), 0.0016 part of ferrous sulfate ($7H_2O$), 0.2 part of sodium formaldehyde sulfoxylate and 0.004 part of ethylenediaminetetraacetic acid disodium salt were added. Then a monomer mixture solution of 13.2 parts of methyl methacrylate (MMA), 1.8 parts of butyl methacrylate (BMA) and 0.012 part of cumene hydroperoxide (CHP) was added continuously for one hour, followed by post-polymerization for one hour to give hollow graft copolymer particles (III-1) having an average particle size of 130 nm.

(2) Preparation of Graft Copolymer Particle (III-2)

A polymerizer was charged with 65 parts of a latex of hollow rubber particles (II-2) (solid content) and 250 parts of water, followed by replacing with nitrogen gas. After heating up to 65° C., 0.8 part of sodium dioctylsulfosuccinate (solid content), 0.004 part of ethylenediaminetetraacetic acid disodium salt, 0.001 part of ferrous sulfate ($7H_2O$) and 0.2 part of sodium formaldehyde sulfoxylate were added. Then a mixture solution of 9 parts of acrylonitrile (AN), 26 parts of styrene (St) and 0.3 part of cumene hydroperoxide was added continuously for five hours (An adding amount of the monomer per one hour was 7 parts). One and a half hours after the starting of the continuous addition, 0.5 part of sodium dioctylsulfosuccinate (solid content) was added, and three hours after the starting of the continuous addition, 0.5 part of sodium dioctylsulfosuccinate (solid content) was added. Then post-polymerization was carried out for two hours to give a latex of hollow graft copolymer particles (III-2) having an average particle size of 220 nm. Percentage of the polymerization was 98%, and a proportion of graft chains was 35%.

(3) Preparation of Graft Copolymer Particles (III-3) to (III-14)

Preparation was carried out in the same manner as in the graft copolymer particles (III-2) except that the components shown in Table 2 were used. Percentage of polymerization and proportion of graft chains are shown in Table 2.

GMA: Glycidyl methacrylate
TDM: t-Dodecylmercaptan
CHP: Cumene hydroperoxide

[4] Preparation of Thermoplastic Resin (A)

(1) Thermoplastic Resin (A-1)

A polymerizer was charged with 250 parts of water and 0.5 part of sodium dioctylsulfosuccinate (solid content), followed by heating up to 60° C. and replacing with nitrogen gas. After 0.01 part of ethylenediaminetetraacetic acid disodium salt, 0.0025 part of ferrous sulfate ($7H_2O$) and 0.4 part of sodium formaldehyde sulfoxylate were added, a mixture solution of 28 parts of acrylonitrile, 72 parts of styrene, 0.38 part of t-dodecylmercaptan and 0.2 part of cumene hydroperoxide was added continuously for eight hours. One and a half hours after the starting of the continuous addition, 0.5 part of sodium dioctylsulfosuccinate (solid content) was added, and three hours after the starting of the continuous addition, 0.5 part of sodium dioctylsulfosuccinate (solid content) was added. Then post-polymerization was carried out for 12 hours to give a latex of a thermoplastic aromatic vinyl resin ((A-1): acrylonitrile-styrene resin (AS)). Percentage of the polymerization was 99%, and a weight average molecular weight was 150,000.

(2) Thermoplastic Resin (A-2)

A latex of a thermoplastic aromatic vinyl resin ((A-2): acrylonitrile-α-methylstyrene resin (AαMS)) was prepared by polymerizing in the same manner as in (A-1) except that 30 parts of acrylonitrile, 68 parts of α-methylstyrene, 2 parts of styrene, 0.35 part of t-dodecylmercaptan and 0.4 part of cumene hydroperoxide were used. Percentage of the polymerization was 97%, and a weight average molecular weight was 130,000.

(3) Thermoplastic Resin (A-3)

A latex of a thermoplastic aromatic vinyl resin ((A-3): acrylonitrile-N-phenylmaleimide-styrene resin (APMI)) was prepared by polymerizing in the same manner as in (A-1) except that 20 parts of acrylonitrile, 20 parts of N-phenylmaleimide, 60 parts of styrene, 0.35 part of t-dodecylmercaptan and 0.2 part of cumene hydroperoxide were used. Percentage of the polymerization was 99%, and a weight average molecular weight was 140,000.

(4) Thermoplastic Resin (A-4)

A latex of a thermoplastic aromatic vinyl resin ((A-4): acrylonitrile-styrene resin (AS)) was prepared by polymer-

TABLE 2

| | Graft copolymer particles (III) | | | | | | | | | | | | | |
|---|---|---|---|---|---|---|---|---|---|---|---|---|---|---|
| | III-1 | III-2 | III-3 | III-4 | III-5 | III-6 | III-7 | III-8 | III-9 | III-10 | III-11 | III-12 | III-13 | III-14 |
| Hollow rubber particles (II) | II-1 | II-2 | II-3 | II-4 | II-5 | II-6 | II-7 | II-2 | II-3 | — | — | — | — | — |
| Solid content (part) | (85) | (65) | (55) | (60) | (55) | (60) | (70) | (25) | (35) | — | — | — | — | — |
| Solid rubber particles (II) | — | — | — | — | — | — | — | — | — | I-4 | II-8 | II-9 | I-4 | I-4 |
| Solid content (part) | — | — | — | — | — | — | — | — | — | (65) | (65) | (65) | (25) | (35) |
| Graft chain (part) | | | | | | | | | | | | | | |
| AN | — | 9 | — | 14 | 11 | 10 | 9 | 18 | 13 | 9 | 9 | 9 | 18 | 13 |
| ST | — | 26 | 10 | 26 | 34 | 30 | 21 | 52 | 37 | 26 | 26 | 26 | 52 | 37 |
| MMA | 13.2 | — | 30 | — | — | — | — | — | 10 | — | — | — | — | 10 |
| BMA | 1.8 | — | 5 | — | — | — | — | — | — | — | — | — | — | — |
| BA | — | — | — | — | — | — | — | — | — | — | — | — | — | — |
| MAA | — | — | — | — | — | — | — | 5 | — | — | — | — | 5 | — |
| GMA | — | — | — | — | — | — | — | — | 5 | — | — | — | — | 5 |
| TDM | — | — | — | — | — | — | — | 0.4 | 0.05 | — | — | — | 0.4 | 0.05 |
| CHP | — | 0.3 | 0.3 | 0.3 | 0.3 | 0.3 | 0.2 | 0.3 | 0.3 | 0.3 | 0.3 | 0.3 | 0.3 | 0.3 |
| Percentage of polymerization (%) | 98 | 98 | 99 | 99 | 99 | 99 | 98 | 99 | 99 | 98 | 99 | 99 | 99 | 99 |

Abbreviations in Table 2 represent the following compounds.

AN: Acrylonitrile
ST: Styrene
MMA: Methyl methacrylate
BMA: Butyl methacrylate
BA: Butyl acrylate
MAA: Methacrylic acid izing in the same manner as in (A-1) except that 25.5 parts of acrylonitrile, 74.5 parts of styrene, 1 part of t-dodecylmercaptan and 0.4 part of cumene hydroperoxide were used. Percentage of the polymerization was 99%, and a weight average molecular weight was 50,000.

(5) Thermoplastic Resins (A-5) to (A-11)

The following thermoplastic resins were used.

(A-5): Polycarbonate (PC, number average molecular weight: 23,000)

(A-6): Polyethylene terephthalate (PET, number average molecular weight: 20,000)

(A-7): Nylon 6 (PA, number average molecular weight: 25,000)

(A-8): Polyvinyl chloride (PVC, degree of polymerization: 600)

(A-9): Polyvinyl chloride (PVC, degree of polymerization: 700)

(A-10): Chlorinated polyvinyl chloride (CPVC, chlorine content: 68%, average degree of polymerization: 900)

(A-11): Polymethyl methacrylate (PMMA, CP-1000E available from ICI Corporation)

[5] Preparation of Thermoplastic Resin Composition

Example 1

The latex of the hollow graft copolymer particles (III-1) was solidified with calcium chloride, heat-treated, dehydrated and dried to give hollow graft copolymer particles (III-1) in the form of powder.

Then the hollow graft copolymer particles (III-1) in an amount shown in Table 3, 2 parts of dioctyltinmercaptide, 0.8 part of polyol ester, 0.2 part of diol ester of montanic acid and 100 parts of polyvinyl chloride (PVC, A-9, average degree of polymerization: 700) were blended uniformly in a blender (available from Kabushiki Kaisha Tabata, 20 liters). Further the mixed powder was kneaded at 160° for five minutes with rolls, and then press-molded at 190° C. for 10 minutes to give a 6.0 mm thick sheet.

A thin test piece was obtained from the sheet, dyed with $RuO_4$ and observed with a transmission electron microscope. It was confirmed that the hollow graft copolymer particles were dispersed in polyvinyl chloride.

Izod impact strength, tensile strength and tensile elongation of the sheet were determined by the methods mentioned hereinafter. The results are shown in Table 3.

Comparative Example 1

10 Parts of rubber latex (I-1) (solid content), 470 parts of water, 0.15 part of a 5% aqueous solution of sodium lauryl sulfate (solid content), 0.002 part of ferrous sulfate ($7H_2O$), 0.005 part of ethylenediaminetetraacetic acid disodium salt and 0.2 part of sodium formaldehyde sulfoxylate were mixed, and heated up to 40° C. Then thereto was added a mixture solution of 75 parts of butyl acrylate, 7.5 parts of allyl methacrylate and 1 part of cumene hydroperoxide continuously for six hours for polymerization. At the time of the polymerization, 75 minutes, 150 minutes and 225 minutes after starting of the polymerization, 0.15 part of sodium lauryl sulfate was added, respectively. Further after carrying out 30-minute post-polymerization and heating up to 45° C., 0.15 part of a 5% aqueous solution of sodium lauryl sulfate (solid content), 0.0016 part of ferrous sulfate ($7H_2O$), 0.004 part of ethylenediaminetetraacetic acid disodium salt and 0.2 part of sodium formaldehyde sulfoxylate were added, and then a mixture solution of 13.2 parts of methyl methacrylate, 1.8 parts of butyl methacrylate and 0.012 part of cumene hydroperoxide was added continuously for one hour. Then one-hour post-polymerization was carried out to give a latex of solid graft copolymer particles having an average particle size of 130 nm. The latex of the solid graft copolymer particles was solidified with calcium chloride, heat-treated, dehydrated and dried to be in the form of powder.

A sheet was obtained by blending and press-molding in the same manner as in Example 1 except that the solid graft copolymer particles were used instead of the hollow graft copolymer particles (III-1).

With respect to the obtained sheet, the same physical properties as in Example 1 were determined. The results are shown in Table 3.

TABLE 3

| | | Physical properties of molded article obtained from thermoplastic resin composition | | |
|---|---|---|---|---|
| | Adding amount of graft copolymer particles (part) | Izod impact strength (kg × cm/cm²) | Tensile strength (kgf/cm²) | Tensile elongation (%) |
| Ex. 1 | 3 | 6.5 | 560 | 13.0 |
| | 5 | 12.0 | 541 | 15.2 |
| | 8 | 30.5 | 501 | 18.1 |
| | 10 | 42.5 | 488 | 23.6 |
| | 11 | 111.0 | 463 | 24.1 |
| Com. Ex. 1 | 0 | 2.1 | 610 | 8.0 |
| | 3 | 2.3 | 575 | 10.5 |
| | 5 | 5.0 | 556 | 12.4 |
| | 8 | 10.1 | 524 | 18.1 |
| | 10 | 18.5 | 500 | 22.6 |
| | 11 | 54.0 | 482 | 23.6 |

Example 2

A powder of the hollow graft copolymer particles (III-1) in an amount shown in Table 4, 2 parts of dioctyltinmercaptide, 1.0 part of chlorinated polyethylene and 100 parts of chlorinated polyvinyl chloride (CPVC, (A-10), average degree of polymerization: 900) were blended uniformly in a blender (available from Kabushiki Kaisha Tabata, 20 liters). Further the mixed powder was kneaded at 210° C. for five minutes with rolls, and then press-molded at 200° C. for 10 minutes to give a 6.0 mm thick sheet.

With respect to the obtained sheet, Izod impact strength was determined. The results are shown in Table 4.

Comparative Example 2

A sheet was obtained by blending and press-molding in the same manner as in Example 2 except that the solid graft copolymer particles prepared in Comparative Example 1 were used instead of the hollow graft copolymer particles (III-1).

With respect to the obtained sheet, Izod impact strength was determined. The results are shown in Table 4.

TABLE 4

|  | Adding amount of graft copolymer particles (part) | Izod impact strength (kg · cm/cm²) |
|---|---|---|
| Ex. 2 | 5 | 9.1 |
|  | 8 | 12.4 |
|  | 10 | 17.4 |
|  | 20 | 28.4 |
|  | 30 | 30.9 |
| Com. Ex. 2 | 0 | 3.8 |
|  | 5 | 4.5 |
|  | 8 | 6.1 |
|  | 10 | 7.9 |
|  | 20 | 9.3 |
|  | 30 | 11.2 |

Example 3

A powder of the hollow graft copolymer particles (III-1) in an amount shown in Table 5 and 100 parts of polymethyl methacrylate (PMMA, A-11) were blended uniformly in a blender (available from Kabushiki Kaisha Tabata, 20 liters). Further the mixed powder was kneaded at 180° C. for five minutes with rolls, and then press-molded at 190° C. for 10 minutes to give a 6.0 mm thick sheet.

With respect to the obtained sheet, Izod impact strength was determined. The results are shown in Table 5.

Comparative Example 3

A sheet was obtained by blending and press-molding in the same manner as in Example 3 except that the solid graft copolymer particles prepared in Comparative Example 1 were used instead of the hollow graft copolymer particles (III-1).

With respect to the obtained sheet, Izod impact strength was determined, The results are shown in Table 5.

TABLE 5

|  | Adding amount of graft copolymer particles (part) | Izod impact strength (kg · cm/cm²) |
|---|---|---|
| Ex. 3 | 5 | 1.4 |
|  | 8 | 1.7 |
|  | 20 | 2.1 |
|  | 40 | 3.5 |
|  | 60 | 5.2 |

TABLE 5-continued

|  | Adding amount of graft copolymer particles (part) | Izod impact strength (kg · cm/cm²) |
|---|---|---|
| Com. Ex. 3 | 0 | 1.1 |
|  | 5 | 1.1 |
|  | 8 | 1.1 |
|  | 20 | 1.5 |
|  | 40 | 2.2 |
|  | 60 | 2.9 |

Example 4

After mixing 5 parts of a latex of the hollow graft copolymer particles (III-2) (solid content) and 25 parts of a latex of the thermoplastic resin (acrilonitrile-α-methylstyrene copolymer (AαMS), (A-2)) (solid content) and adding thereto a phenolic antioxidant, calcium chloride was added to the mixture for solidifying, followed by heat-treating, dehydrating and drying, thus giving a mixture powder of a thermoplastic resin.

To 30 parts of the obtained resin composition were added 75 parts of polycarbonate (PC)(A-5), (0.5 part of 2,2-methylenebis(4,6-di-t-butylphenyl)octyl phosphite, 0.5 part of n-octadecyl-3-(4-hydroxy-3,5-di-t-butylphenyl) propionate and 1 part of stearyl stearate, followed by blending with a blender (available from Kabushiki Kaisha Tabata, 20 liters) and then melt-kneading at 285° C. with a single screw extruder (40 mm available from Kabushiki Kaisha Tabata to give pellets of a thermoplastic resin.

flowability of the obtained pellets was determined with the use of an injection molding machine (FAS-100B) available from Fanac Co., Ltd. Also a test piece for an Izod impact test, tensile strength and elongation tests and a test for measuring a thermal decomposition temperature was made. Each physical property was determined by the methods mentioned hereinafter. The results are shown in Table 6.

Examples 5 to 12 and Comparative Examples 4 to 7

Pellets were made in the same manner as in Example 4 except that the hollow graft copolymer particles or the solid graft copolymer particles for comparison were mixed in amounts shown in Table 6. Physical properties of the resin compositions were determined. The results are shown in Table 6.

TABLE 6

|  | Ex. 4 | Ex. 5 | Ex. 6 | Ex. 7 | Ex. 8 | Ex. 9 | Ex. 10 | Ex. 11 | Ex. 12 | Com. Ex. 4 | Com. Ex. 5 | Com. Ex. 6 | Com. Ex. 7 |
|---|---|---|---|---|---|---|---|---|---|---|---|---|---|
| Graft copolymer particles (part) | | | | | | | | | | | | | |
| III-2 | 5 | — | — | 23 | — | — | — | — | — | — | — | — | — |
| III-3 | — | — | — | — | — | 20 | — | — | — | — | — | — | — |
| III-4 | — | 3 | — | — | — | — | — | 23 | — | — | — | — | — |
| III-5 | — | — | 8 | — | — | — | — | — | 23 | — | — | — | — |
| III-6 | — | — | — | — | 35 | — | 60 | — | — | — | — | — | — |
| III-7 | — | — | — | — | — | 20 | — | — | — | — | — | — | — |
| III-10 | — | — | — | — | — | — | — | — | — | 5 | 23 | — | — |
| III-11 | — | — | — | — | — | — | — | — | — | — | — | 23 | — |
| III-12 | — | — | — | — | — | — | — | — | — | — | — | — | 23 |

TABLE 6-continued

|  | Ex. 4 | Ex. 5 | Ex. 6 | Ex. 7 | Ex. 8 | Ex. 9 | Ex. 10 | Ex. 11 | Ex. 12 | Com. Ex. 4 | Com. Ex. 5 | Com. Ex. 6 | Com. Ex. 7 |
|---|---|---|---|---|---|---|---|---|---|---|---|---|---|
| Thermoplastic resin (part) | | | | | | | | | | | | | |
| A-1 (AS) | — | — | — | 77 | — | — | 40 | 77 | 77 | — | 77 | 77 | 77 |
| A-2 (AαMS) | 25 | 25 | 25 | — | 65 | — | — | — | — | 25 | — | — | — |
| A-3 (APMI) | — | — | — | — | — | 60 | — | — | — | — | — | — | — |
| A-5 (PC) | 75 | 75 | 75 | — | — | — | — | — | — | 75 | — | — | — |
| Average particle size (nm) | 190 | 410 | 430 | 190 | 380 | 110/590 | 380 | 410 | 430 | 185 | 185 | 420 | 400 |
| Amount of rubber (%) | 3 | 2 | 4 | 15 | 21 | 25 | 36 | 14 | 13 | 3 | 15 | 15 | 15 |
| Izod impact strength (kg cm/cm$^2$) | 21 | 16 | 26 | 10 | 15 | 17 | 26 | 14 | 12 | 11 | 5 | 8 | 7 |
| Impact strength by a falling weight method (kgm) | — | — | — | 3.8 | 4.5 | 4.8 | 6.0 | 4.7 | 4.5 | — | 2.1 | 3.4 | 2.9 |
| Tensile strength (kgf/cm$^2$) | 700 | 710 | 660 | 455 | 450 | 425 | 340 | 445 | 450 | 690 | 465 | 455 | 460 |
| Tensile elongation (%) | 54 | 43 | 86 | 28 | 35 | 40 | 45 | 33 | 30 | 41 | 12 | 23 | 18 |
| Thermal decomposition temperature (° C.) | 121 | 122 | 120 | 94 | 109 | 108 | 84 | 93 | 94 | 121 | 93 | 92 | 93 |
| Flowability (nm) | 390 | 400 | 380 | 810 | 440 | 450 | 550 | 760 | 800 | 390 | 800 | 755 | 795 |

Examples 13 to 17 and Comparative Examples 8 to 11

Pellets were made in the same manner as in Example 4 except that hollow or solid graft copolymer particles and thermoplastic resins shown in Table 7 were used in amounts shown in Table 7. Physical properties of the resin compositions were determined in the same manner as in Example 4. The results are shown in Table 7.

In Examples 13, 15, 16 and 17 and Comparative Examples 8, 10 and 11, a temperature of the single screw extruder at kneading was 285° C., and in Example 14 and Comparative Example 9 the temperature was 270° C.

Examples 18 to 20 and Comparative Examples 12 and 13

Pellets were made in the same manner as in Example 4 except that hollow or solid graft copolymer particles and thermoplastic resins shown in Table 8 were used in amounts shown in Table 8. Physical properties of the resin compositions were determined in the same manner as in Example 4. The results are shown in Table 8.

A temperature of the single screw extruder at kneading was 240° C. in Example 18 and Comparative Example 12, and 270° C. in Examples 19 and 20 and Comparative Example 13.

TABLE 7

|  | Ex. 13 | Ex. 14 | Ex. 15 | Ex. 16 | Ex. 17 | Com. Ex. 8 | Com. Ex. 9 | Com. Ex. 10 | Com. Ex. 11 |
|---|---|---|---|---|---|---|---|---|---|
| Graft copolymer particles (part) | | | | | | | | | |
| III-2 | — | — | 15 | — | — | — | — | — | — |
| III-3 | — | — | — | 30 | — | — | — | — | — |
| III-8 | — | 5 | — | — | — | — | — | — | — |
| III-9 | 5 | — | — | — | 20 | — | — | — | — |
| III-10 | — | — | — | — | — | — | — | 15 | — |
| III-13 | — | — | — | — | — | — | 5 | — | — |
| III-14 | — | — | — | — | — | 5 | — | — | 20 |
| Thermoplastic resin (part) | | | | | | | | | |
| A-2 (AαMS) | — | 35 | 15 | 40 | — | — | 35 | 15 | — |
| A-5 (PC) | 50 | — | 70 | 30 | 40 | 50 | — | 70 | 40 |
| A-6 (PET) | 50 | — | — | — | 40 | 50 | — | — | 40 |
| A-7 (PA) | — | 65 | — | — | — | — | 65 | — | — |
| Average particle size (nm) | 110 | 185 | 190 | 110 | 110 | 110 | 185 | 185 | 110 |
| Amount of rubber (%) | 2 | 1 | 9.8 | 16.5 | 7.0 | 2 | 1 | 9.8 | 7.0 |
| Izod impact strength (kg · cm/cm$^2$) | 20 | 8 | 35 | 33 | 34 | 10 | 5 | 21 | 22 |
| Tensile strength (kgf/cm$^2$) | 640 | 625 | 610 | 540 | 560 | 650 | 620 | 615 | 570 |
| Tensile elongation (%) | 63 | 45 | 135 | 105 | 140 | 50 | 38 | 98 | 110 |
| Thermal decomposition temperature (° C.) | 116 | 103 | 118 | 103 | 114 | 116 | 102 | 123 | 114 |
| Flowability (nm) | 540 | 680 | 340 | 510 | 510 | 535 | 665 | 330 | 510 |

TABLE 8

| | Ex. 18 | Ex. 19 | Ex. 20 | Com. Ex. 12 | Com. Ex. 13 |
|---|---|---|---|---|---|
| Graft copolymer particles (part) | | | | | |
| III-2 | 5 | — | — | — | — |
| III-8 | — | 65 | 25 | — | — |
| III-10 | — | — | — | 5 | — |
| III-13 | — | — | — | — | 25 |
| Thermoplastic resin (part) | | | | | |
| A-1 (AS) | 100 | — | — | 100 | — |
| A-2 (AαMS) | — | — | 10 | — | 10 |
| A-7 (PA) | — | 35 | 65 | — | 65 |
| Average particle size (nm) | 190 | 190 | 190 | 185 | 190 |
| Amount of rubber (%) | 3 | 16.3 | 6.3 | 3 | 6.3 |
| Izod impact strength (kg·cm/cm$^2$) | 8 | 18 | 10 | 5 | 6 |
| Tensile strength (kgf/cm$^2$) | 485 | 545 | 590 | 490 | 595 |
| Tensile elongation (%) | 14 | 95 | 60 | 9 | 43 |
| Thermal decomposition temperature (° C.) | 95 | 98 | 101 | 94 | 100 |
| Flowability (mm) | 860 | 610 | 660 | 860 | 655 |

Examples 21 to 23 and Comparative Examples 13 and 14

Pellets were made in the same manner as in Example 4 except that hollow or solid graft copolymer particles and thermoplastic resins shown in Table 9 were used in amounts shown in Table 9 and that 1 part of dioctyltinmaleate polymer, 3 parts of dioctyltinmercaptide and 2 parts of stearyl stearate were used instead of 1 part of stearyl stearate. Physical properties of the resin compositions were determined in the same manner as in Example 4. The results are shown in Table 9.

A temperature of the single screw extruder at kneading was 180° C.

TABLE 9

| | Ex. 21 | Ex. 22 | Ex. 23 | Com. Ex. 14 | Com. Ex. 15 |
|---|---|---|---|---|---|
| Graft copolymer particles (part) | | | | | |
| III-2 | — | 20 | — | — | — |
| III-3 | 5 | — | 30 | — | — |
| III-10 | — | — | — | 5 | 30 |
| Thermoplastic resin (part) | | | | | |
| A-2 (AαMS) | — | 20 | — | — | — |
| A-4 (AS) | 45 | — | 20 | 45 | 20 |
| A-8 (PVC) | 55 | 60 | 50 | 55 | 50 |
| Average particle size (nm) | 110 | 190 | 110 | 185 | 185 |
| Amount of rubber (%) | 3 | 13 | 16.5 | 3 | 13 |
| Izod impact strength (kg·cm/cm$^2$) | 14 | 21 | 27 | 9 | 16 |
| Tensile strength (kgf/cm$^2$) | 425 | 425 | 385 | 430 | 390 |
| Tensile elongation (%) | 18 | 30 | 40 | 9 | 30 |
| Thermal decomposition temperature (° C.) | 70 | 73 | 69 | 70 | 69 |
| Flowability (mm) | 585 | 560 | 555 | 585 | 550 |

The thermoplastic resins (A-1) to (A-4) were mixed in the form of latex to the hollow graft copolymer particles (III) in the same manner as in (A-2) of Example 4, and the thermoplastic resins (A-5) to (A-7) were mixed in the form of powder to other resin powder, stabilizer, etc. by a blender in the same manner as in (A-5) of Example 4.

Methods which were used for determining each physical property in this specification are then explained below.

[Measurement of molecular weight and degree of polymerization]

A molecular weight of graft chains of the graft copolymer (III) was determined by measuring weight average molecular weight of the graft copolymer (III) soluble in methyl ethyl ketone which was converted based on polystyrene with GPC (gel permeation chromatography). Among the thermoplastic resins, a weight average molecular weight of a styrene resin was measured based on polystyrene with GPC in the same manner as above. With respect to a vinyl chloride resin, a viscosity average polymerization degree thereof was measured according to JIS K 6721. With respect to polycarbonate, polyester and Nylon 6, nominal values (number average molecular weight) of those commercially available were employed.

[Graft ratio of graft copolymer]

A powder of a graft copolymer (III) was dissolved in methyl ethyl ketone and centrifuged to give soluble and insoluble portions thereof in methyl ethyl ketone. A graft ratio was determined by using the proportion of those soluble and insoluble portions.

[Particle size of rubber polymer]

Measurement was made with Ultrafine particle analyzer MICRO TRAC UPA Model 9230 available from Nikkisou Kabushiki Kaisha by using a latex.

[Percentage of polymerization at polymerizing]

Percentage of polymerization at polymerizing was calculated by using the results of measurement with a gas chromatograph.

[Cavity ratio of hollow rubber polymer]

Hollow rubber polymer latex was embedded with an epoxy resin, formed into a thin test piece and then dyed with $RuO_4$. By using a transmission electron microscopic photograph of a cut surface of the test piece, a shape of a cavity and a cavity ratio of a particle, provided that the shape of the particle is sphere, were obtained through picture analysis.

[Characteristics of thermoplastic resin composition]

Impact resistance was evaluated by Izod impact strength (unit: kg·cm/cm$^2$) which was measured at 23° C. according to the method of ASTM D-256 standard (thickness: ¼ inch).

Impact strength by a falling weight method was determined by making 2 mm thick test pieces in the form of a plate of 100×150 mm and measuring a 50% failure height (which causes the failure of 50% of test pieces in a falling weight test)×load at 23° C. (unit: kgm).

Tensile strength and tensile elongation were evaluated at 23° C. by using a No. 1 dumbbell according to ASTM D638 standard.

Heat resistance was evaluated by a thermal decomposition temperature by using 18.6 kg/cm$^2$ load according to ASTM D648 standard.

Flowability was evaluated by a length (unit: mm) of flow of a resin in a 3 mm thick mold die of a spiral form at a cylinder temperature of 250° C. at an injection pressure of 1,350 kg/cm$^2$ by using FAS-100B injection molding machine available from Fanac Co., Ltd.

Use of hollow graft copolymer particles of the present invention in a relatively small amount can further improve impact resistance of a thermoplastic resin and reduce cost.

What is claimed is:

1. A thermoplastic resin composition which has improved impact resistance, comprises a thermoplastic resin (A) and graft copolymer particles (B) having a hollow rubber portion and graft chain and contains the thermoplastic resin (A) and the graft copolymer, particles in a weight ratio (A)/(B) of 2/98 to 100/1.

2. The composition of claim 1, wherein the graft copolymer particles (B) comprise a particle composed of 10 to 95% by weight of the hollow rubber portion and 5 to 90% by weight of the graft chain obtained by polymerizing a vinyl monomer graft-copolymerizable with said rubber portion.

3. The composition of claim 1, wherein a volumetric proportion of hollow part in the hollow rubber portion of the graft copolymer particle (B) is 1 to 70% by volume on the basis of the hollow rubber portion.

4. The composition of claim 2, wherein a volumetric proportion of hollow part in the hollow rubber portion of the graft copolymer particle (B) is 1 to 70% by volume on the basis of the hollow rubber portion.

5. The composition of claim 1, wherein an average particle size of the graft copolymer particles is from 50 to 2,000 nm.

6. The composition of claim 2, wherein an average particle size of the graft copolymer particles is from 50 to 2,000 nm.

7. The composition of claim 3, wherein an average particle size of the graft copolymer particles is from 50 to 2,000 nm.

8. The composition of claim 4, wherein an average particle size of the graft copolymer particles is from 50 to 2,000 nm.

9. The composition of claim 1, wherein the rubber of the hollow rubber portion is a diene rubber, acrylic rubber, silicone rubber or olefin rubber.

10. The composition of claim 1, wherein the rubber of the hollow rubber portion is a rubber composition comprising 100 parts of a crosslinked copolymer obtained by polymerization of 0.05 to 40% by weight of a crosslinkable monomer and 99.95 to 60% by weight of a monomer copolymerizable with said crosslinkable monomer and 0.05 to 50 parts by weight of a polymer being different from said crosslinked copolymer.

11. The composition of claim 2, wherein the vinyl monomer comprises 60 to 100% by weight of at least one monomer selected from the group consisting of an aromatic vinyl compound, vinyl cyanide compound, vinyl chloride and (meth)acrylate compound and 0 to 40% by weight of other monomer copolymerizable with said monomer.

12. The composition of claim 1, wherein the thermoplastic resin (A) is at least one selected from the group consisting of vinyl chloride resin, aromatic vinyl resin, acrylic resin, carbonate resin, polyester resin, amide resin and an olefin resin.

13. The composition of claim 12, wherein the vinyl chloride resin contains not less than 50% by weight of vinyl chloride unit.

14. The composition of claim 12, wherein the aromatic vinyl resin contains not less than 50% by weight of aromatic vinyl unit.

15. The composition of claim 1, wherein the thermoplastic resin (A) is a polymer alloy containing at least one of vinyl chloride resin, acrylic resin, aromatic vinyl resin, carbonate resin, polyester resin, amide resin and olefin resin.

16. The composition of claim 15, wherein the thermoplastic resin (A) is a polymer alloy of aromatic vinyl resin and vinyl chloride resin.

* * * * *